(12) United States Patent
Gainford et al.

(10) Patent No.: US 8,159,081 B2
(45) Date of Patent: Apr. 17, 2012

(54) CONTROLLING PROPELLER ROTOR OVERSPEED

(75) Inventors: David Michael Gainford, Birmingham (GB); Jonathan Edmund Holt, Derbyshire (GB)

(73) Assignee: Rolls-Royce PLC (GB)

( * ) Notice: Subject to any disclaimer, the term of this patent is extended or adjusted under 35 U.S.C. 154(b) by 464 days.

(21) Appl. No.: 12/555,425

(22) Filed: Sep. 8, 2009

(65) Prior Publication Data

US 2010/0066098 A1    Mar. 18, 2010

(30) Foreign Application Priority Data

Sep. 12, 2008    (GB) ................... 0816636.5

(51) Int. Cl.
| | |
|---|---|
| F01D 15/10 | (2006.01) |
| F02C 6/00 | (2006.01) |
| H02K 7/18 | (2006.01) |
| H02P 9/04 | (2006.01) |
| F02D 31/00 | (2006.01) |
| F02D 35/00 | (2006.01) |
| F02D 29/06 | (2006.01) |
| F02C 3/14 | (2006.01) |
| F02C 5/02 | (2006.01) |
| F02C 3/00 | (2006.01) |
| F02C 5/00 | (2006.01) |

(52) U.S. Cl. ...... 290/52; 290/40 A; 290/40 C; 60/39.34; 60/39.44; 700/287; 700/290; 123/200
(58) Field of Classification Search ................ 290/40 A, 290/40 C, 52; 700/287, 290; 60/39.34, 39.44; 123/200

See application file for complete search history.

(56) References Cited

U.S. PATENT DOCUMENTS

| | | | | |
|---|---|---|---|---|
| 3,097,488 | A | * | 7/1963 | Eggenberger et al. ......... 415/15 |
| 3,601,617 | A | * | 8/1971 | Mello et al. ................ 290/40 C |
| 3,636,545 | A | * | 1/1972 | Boyd et al. .................... 702/147 |
| 3,639,076 | A | * | 2/1972 | Rowen .......................... 416/30 |
| 3,911,285 | A | * | 10/1975 | Yannone et al. ............ 290/40 R |
| 3,924,141 | A | * | 12/1975 | Yannone et al. ............ 290/40 R |
| 3,943,371 | A | * | 3/1976 | Yannone et al. ............ 290/40 B |
| 3,943,373 | A | * | 3/1976 | Yannone et al. ............ 290/40 R |
| 4,010,605 | A | * | 3/1977 | Uram ............................. 60/790 |
| 4,031,407 | A | * | 6/1977 | Reed ............................. 307/87 |
| 4,032,793 | A | * | 6/1977 | Uram ........................ 290/40 C |
| 4,118,635 | A | * | 10/1978 | Barrett et al. ............... 290/40 R |
| 4,166,221 | A | * | 8/1979 | McGaha et al. ............ 290/40 R |
| 4,195,231 | A | * | 3/1980 | Reed et al. .................. 290/40 R |
| 4,201,923 | A | * | 5/1980 | Reed et al. .................. 290/40 R |
| 4,208,591 | A | * | 6/1980 | Yannone et al. ............ 290/40 R |

(Continued)

FOREIGN PATENT DOCUMENTS

EP    1939396    7/2008

(Continued)

*Primary Examiner* — Pedro J Cuevas
(74) *Attorney, Agent, or Firm* — McCormick, Paulding & Huber LLP

(57) ABSTRACT

An engine having at least one stage of propeller rotor blades, and a load, the at least one stage being associated with electrical generation means to generate electricity for the load. The load is switchable into a high load state in the event of an overspeed signal from the rotor blades. Also a method of controlling rotor overspeed of an engine, characterized by the steps of:
i. detecting an overspeed signal from the at least one stage, and
ii. switching the load into a high load state to apply torque to the at least one stage to counteract the overspeed.

14 Claims, 3 Drawing Sheets

U.S. PATENT DOCUMENTS

| | | | | |
|---|---|---|---|---|
| 4,227,093 A * | 10/1980 | Uram et al. | | 290/40 R |
| 4,246,491 A * | 1/1981 | Waldron et al. | | 290/40 R |
| 4,259,835 A * | 4/1981 | Reed et al. | | 60/39.281 |
| 4,267,458 A * | 5/1981 | Uram et al. | | 290/40 R |
| 4,283,634 A * | 8/1981 | Yannone et al. | | 290/40 R |
| 4,308,463 A * | 12/1981 | Giras et al. | | 290/40 R |
| 4,327,294 A * | 4/1982 | Smith et al. | | 290/40 C |
| 4,352,024 A * | 9/1982 | Geary et al. | | 290/52 |
| 4,380,146 A * | 4/1983 | Yannone et al. | | 60/790 |
| 4,445,180 A * | 4/1984 | Davis et al. | | 700/289 |
| 4,536,126 A * | 8/1985 | Reuther | | 290/40 R |
| 4,687,946 A * | 8/1987 | Jones | | 290/40 R |
| 5,042,246 A * | 8/1991 | Moore et al. | | 60/773 |
| 5,042,247 A * | 8/1991 | Moore | | 60/773 |
| 5,058,373 A * | 10/1991 | Moore | | 60/39.27 |
| 5,069,030 A * | 12/1991 | Moore | | 60/39.27 |
| 5,099,643 A * | 3/1992 | Moore | | 60/39.182 |
| 5,180,923 A * | 1/1993 | Tyler | | 290/40 C |
| 5,199,256 A * | 4/1993 | Moore | | 60/39.182 |
| 5,252,860 A * | 10/1993 | McCarty et al. | | 290/40 R |
| 5,301,499 A * | 4/1994 | Kure-Jensen et al. | | 60/773 |
| 5,521,444 A * | 5/1996 | Foreman | | 307/104 |
| 5,609,465 A * | 3/1997 | Batson et al. | | 415/1 |
| 6,051,951 A * | 4/2000 | Arai et al. | | 318/700 |
| 6,070,405 A * | 6/2000 | Jerye et al. | | 60/773 |
| 6,401,446 B1 * | 6/2002 | Gibbons | | 60/39.281 |
| 6,801,019 B2 * | 10/2004 | Haydock et al. | | 322/17 |
| 6,876,097 B2 * | 4/2005 | Thomas et al. | | 290/40 A |
| 7,188,008 B2 * | 3/2007 | Garnaud et al. | | 701/7 |
| 7,245,040 B2 * | 7/2007 | Mukavetz et al. | | 290/52 |
| 7,343,744 B2 * | 3/2008 | Abelson et al. | | 60/646 |
| 7,352,076 B1 * | 4/2008 | Gabrys | | 290/44 |
| 7,535,684 B2 * | 5/2009 | Ganev et al. | | 361/23 |
| 7,643,928 B2 * | 1/2010 | Soucy | | 701/100 |
| 8,079,802 B2 * | 12/2011 | Takamura et al. | | 415/115 |
| 2007/0013195 A1 * | 1/2007 | Mukavetz et al. | | 290/52 |
| 2007/0087892 A1 | 4/2007 | Orlando et al. | | |
| 2011/0106325 A1 * | 5/2011 | Opina et al. | | 700/287 |
| 2011/0133453 A1 * | 6/2011 | Merswolke et al. | | 290/44 |
| 2011/0320052 A1 * | 12/2011 | Yasugi | | 700/287 |

FOREIGN PATENT DOCUMENTS

| | | |
|---|---|---|
| EP | 1990519 | 11/2008 |
| EP | 2163730 A2 * | 3/2010 |
| GB | 0667583 | 3/1952 |
| GB | 2175652 | 12/1986 |

* cited by examiner

CONTROLLING PROPELLER ROTOR OVERSPEED

CROSS REFERENCE TO RELATED APPLICATION

This application is entitled to the benefit of British Patent Application No. GB 0816636.5, filed on Sep. 12, 2008.

FIELD OF THE INVENTION

The present invention relates to controlling rotor overspeed, particularly in relation to an engine comprising variable pitch propeller rotor blade stages.

BACKGROUND OF THE INVENTION

A known type of gas turbine engine, particularly for use in aircraft propulsion, is a propeller gas turbine engine or turboprop. This works in conventional form, whereby a core engine comprising compressors, combustion equipment and turbines drives one or more propeller rotor stages via a shaft from a free power, or low-pressure, turbine. The one or more propeller rotor stages may be situated at the front or rear of the engine, where front and rear are defined in terms of the direction of airflow through the engine. The propeller rotor blades extend radially outwardly to describe a larger diameter than the core engine. Each blade is pivotable about its own longitudinal axis to change its pitch and thus its angle of attack relative to the airflow. This variable pitch enables more efficient operation at a variety of operating conditions since the incident angle between the airflow and the blade surface can be optimised for the given airspeed and operating mode of the engine and aircraft.

However, one problem with providing propeller rotor stages with variable pitch blades is that the pitch may be commanded to pivot too far, or may fail with the same effect. Pitch angle is defined as shown in FIG. 1 wherein a blade 8 is shown in plan view. The blade 8 is one of a set of rotor blades rotating clockwise as viewed from the left. Thus blade 8 is travelling down the page. Pitch angle $\phi$ is measured clockwise from top dead centre. The smaller the pitch angle $\phi$, the finer the pitch; a larger pitch angle $\phi$ means a coarser pitch. When commanded or failing too fine of the desired pitch angle the blades present a larger surface area to the airflow and restrict the flow passages between adjacent blades. In this situation the blades are driven by the airflow and transmit torque to the core engine, rather than being driven by the core engine, which causes the engine to start overspeeding. If not rapidly controlled, overspeed can cause excessive forces and result in self-destruction of the rotor stage leading to expulsion of high-energy debris. Too fine a blade angle also results in excessive drag, which has a detrimental effect on the performance of the engine and aircraft and may, at extreme angles, cause hazardous or catastrophic loss of control of the aircraft.

Conversely, if the pitch of the blades is commanded to or fails at too coarse an angle the blades begin to feather. At the extreme the blades are edge-on to the airflow and present little or no drag. However, they also exhibit a large resistance to rotation.

During operation of the engine during normal flight modes it is generally possible to prevent propeller rotor blades being driven either too fine or too coarse. However, when transitioning the engine from forward to reverse thrust, often used to provide additional braking force during aircraft landing, the blades must be rotated through fine pitch to an equivalent pitch angle in the opposite direction, e.g. $-\phi$. Conventionally there is an overspeed limiter that acts to prevent the engine transitioning until engine torque is at a predetermined level. It is conventional to drive the rotor blades quickly through fine to the new, reverse thrust angle so that the rotor speed does not increase sufficiently to activate the limiter.

One problem with this approach is that the engine speed is usually minimised prior to transitioning to reverse thrust so that there is a greater speed margin available for the speed surge through fine pitch. This means that if the aircraft needs to go-around, and therefore demands a rapid increase in power from the engine, there is a much larger speed increase required to meet the demand. A further problem is that if there is a minor problem during transition, for example slower than normal transition, an overspeed may occur anyway. A further problem is the dichotomy between providing a larger actuation system to enable rapid engine transition from forward to reverse thrust, and the requirement for a much slower transition from reverse to forward thrust.

There are benefits to providing two stages of propeller rotor blades that rotate in opposite directions and are connected by a differential gearbox. This contra-rotation ensures that airflow leaving the stages is substantially parallel to that entering the stages. However, this may mean that if the forward propeller rotor blades are commanded or fail towards fine pitch little or no airflow can reach the rear propeller stage and little torque would be transmitted to the rear propeller stage. Similarly, if the forward propeller rotor blades are commanded or fail towards coarse pitch, there is excess torque transmitted through the differential gearbox to the rear propeller stage.

SUMMARY OF THE INVENTION

The present invention seeks to provide rotor overspeed control that seeks to address the aforementioned problems.

Accordingly the present invention provides an engine having at least one stage of propeller rotor blades, and an electrical load, the at least one stage being coupled to electrical generation means to generate electricity for the load, characterised in that the load is switchable into a high load state in response to an overspeed signal relating to the at least one stage. This has the benefit of imposing an additional load to draw more power and thereby slow the propeller rotor blades to counteract the signalled overspeed or impending overspeed.

There may be more than one electrical load, each load being switchable into a high load state in response an overspeed signal. This provides flexibility to add lots or some load as required to control the overspeed condition without overloading the electrical generation means.

The electrical generation means may be positioned between the at least one stage of propeller rotor blades and a fixed structure of the engine, or between two propeller rotor stages, or between the at least one stage and another rotating component in the engine. The electricity is preferably generated in the rotating frame of reference, with separate electrical generation mechanisms provided for each propeller rotor blade stage.

The engine may further have a detector to detect a rotor overspeed condition and produce the overspeed signal. The detector may also detect an impending overspeed condition and produce the overspeed signal. This has the benefit of enabling the load or loads to be switched into a high load state to reverse a tendency towards overspeed as well as an actual overspeed condition.

In another aspect of the invention there is a method of controlling rotor overspeed of an engine, the engine having at least one stage of propeller rotor blades, an electrical load and means to generate electricity for the load, the method characterised by the steps of:

i. detecting an overspeed signal relating to the at least one stage, and
  ii. switching the load into a high load state to apply torque to the at least one stage to counteract the overspeed.

This is beneficial because it utilises the excess speed of the rotor stage to draw additional power for the load to slow the propeller stage and thereby control the overspeed.

The step of detecting the overspeed signal may comprise detecting when the at least one stage is within a predetermined overspeed range. This enables the controlling method to begin before the engine has reached overspeed and thereby provide a more timely and quicker acting response.

The engine may have more than one load and the switching step comprise switching at least one load into a high load state, or may comprise switching at least one load into a high load state and at least one other load into a normal load state. This provides more flexibility in the method of controlling rotor overspeed.

The overspeed range may be set to be greater or equal to zero rpm to provide rotor braking. This range may be available when an aircraft having the engine is on the ground to arrest rotation of the propeller without requiring mechanical restraints.

DETAILED DESCRIPTION OF THE PREFERRED EMBODIMENTS

Figure 1:
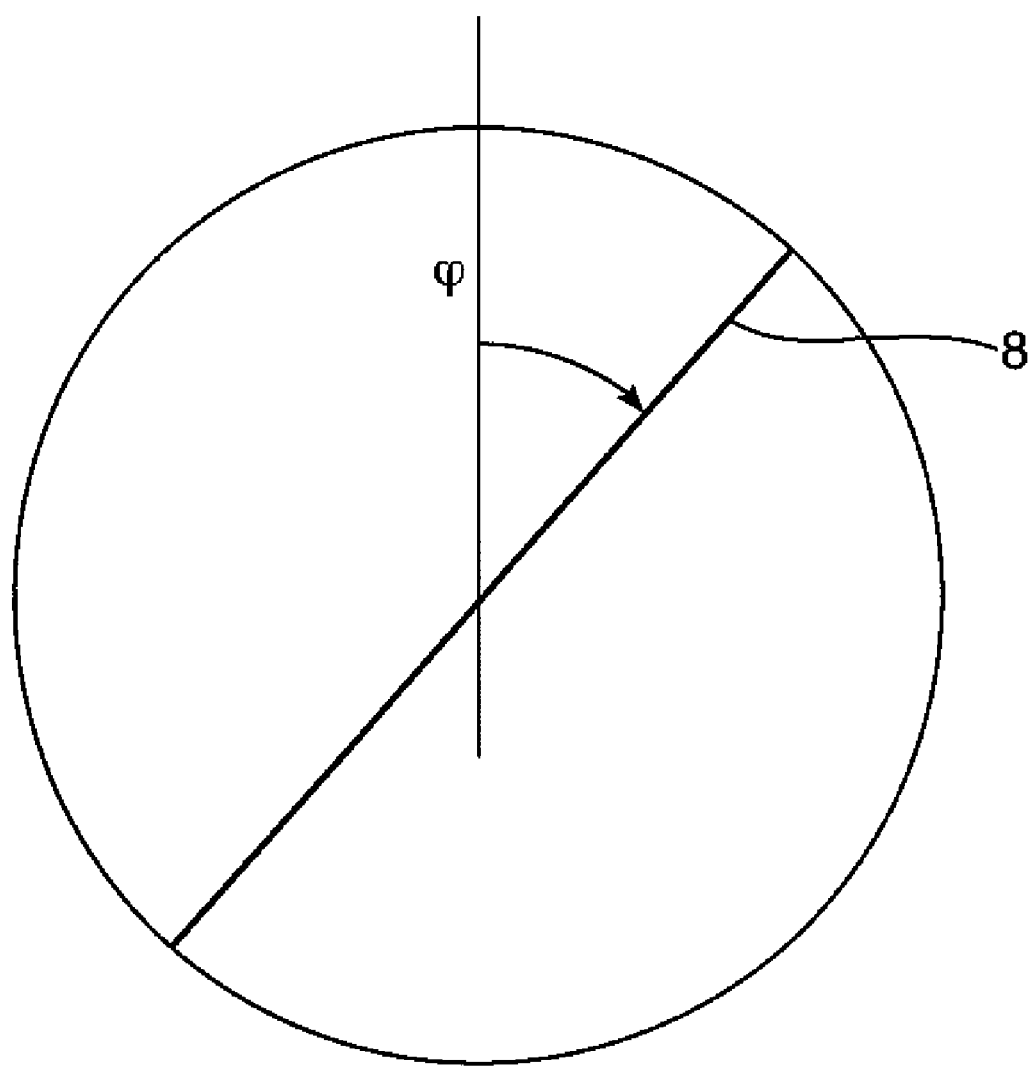
FIG. 1 is a schematic plan view of a blade showing pitch angle.
Figure 2:
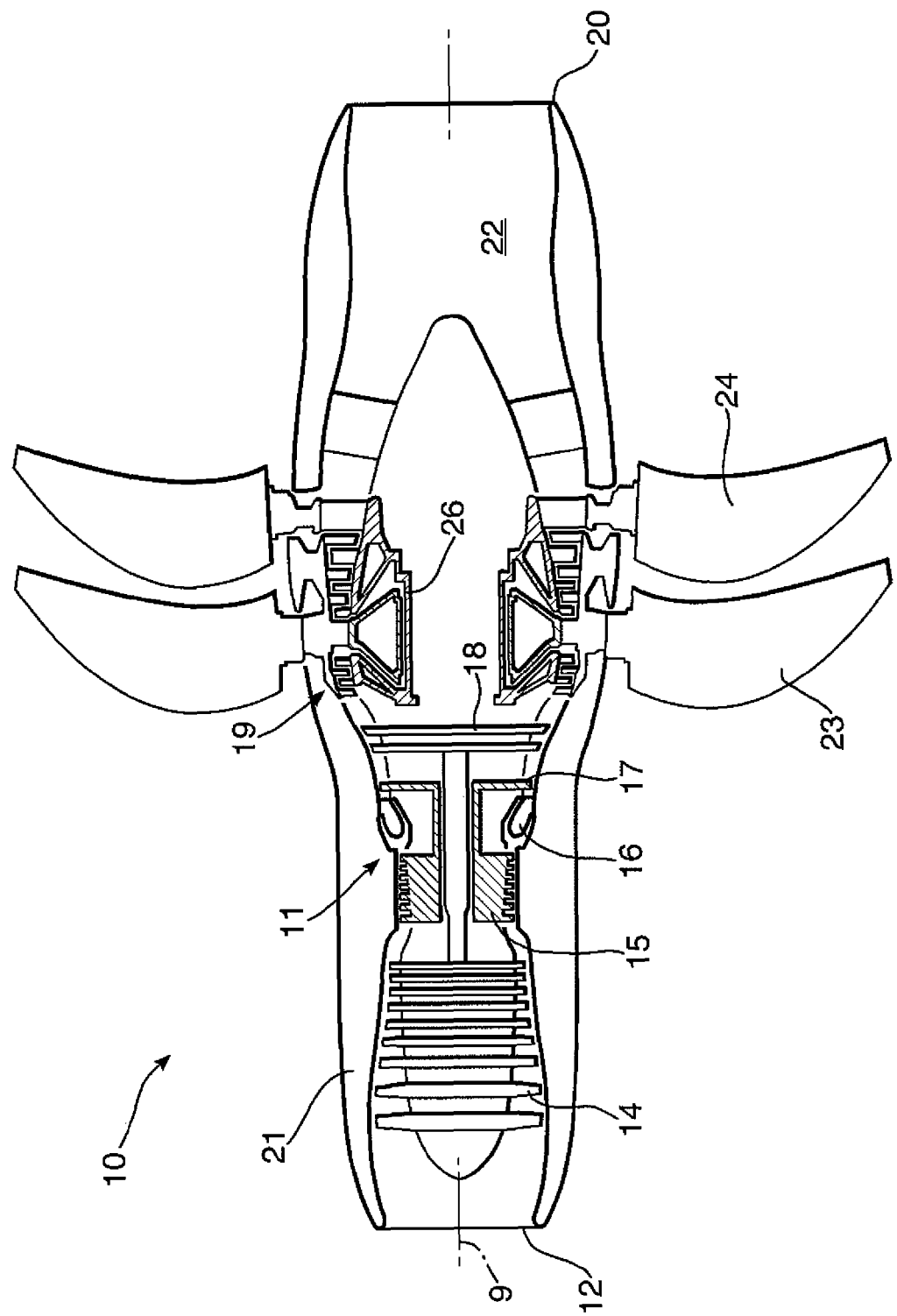
FIG. 2 is a sectional side view of a gas turbine engine having contra-rotating propeller stages.

Referring to FIG. 2, a twin-spooled, contra-rotating propeller gas turbine engine is generally indicated at 10 and has a principal rotational axis 9. The engine 10 comprises a core engine 11 having, in axial flow series, an air intake 12, an intermediate pressure compressor 14, a high-pressure compressor 15, combustion equipment 16, a high-pressure turbine 17, an intermediate pressure turbine 18, a free power (or low-pressure) turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller stages 23, 24 attached to and driven by the free power turbine 19 via shaft 26.

The gas turbine engine 10 works in a conventional manner so that air entering the intake 12 is accelerated and compressed by the intermediate pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, intermediate pressure and free power turbines 17, 18, 19 before being exhausted through the nozzle 20 to provide some propulsive thrust. The high-pressure, intermediate pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust. In the embodiments herein described the propellers 23, 24 rotate in opposite senses so that one rotates clockwise and the other anti-clockwise around the engine's rotational axis 9.

Figure 3:
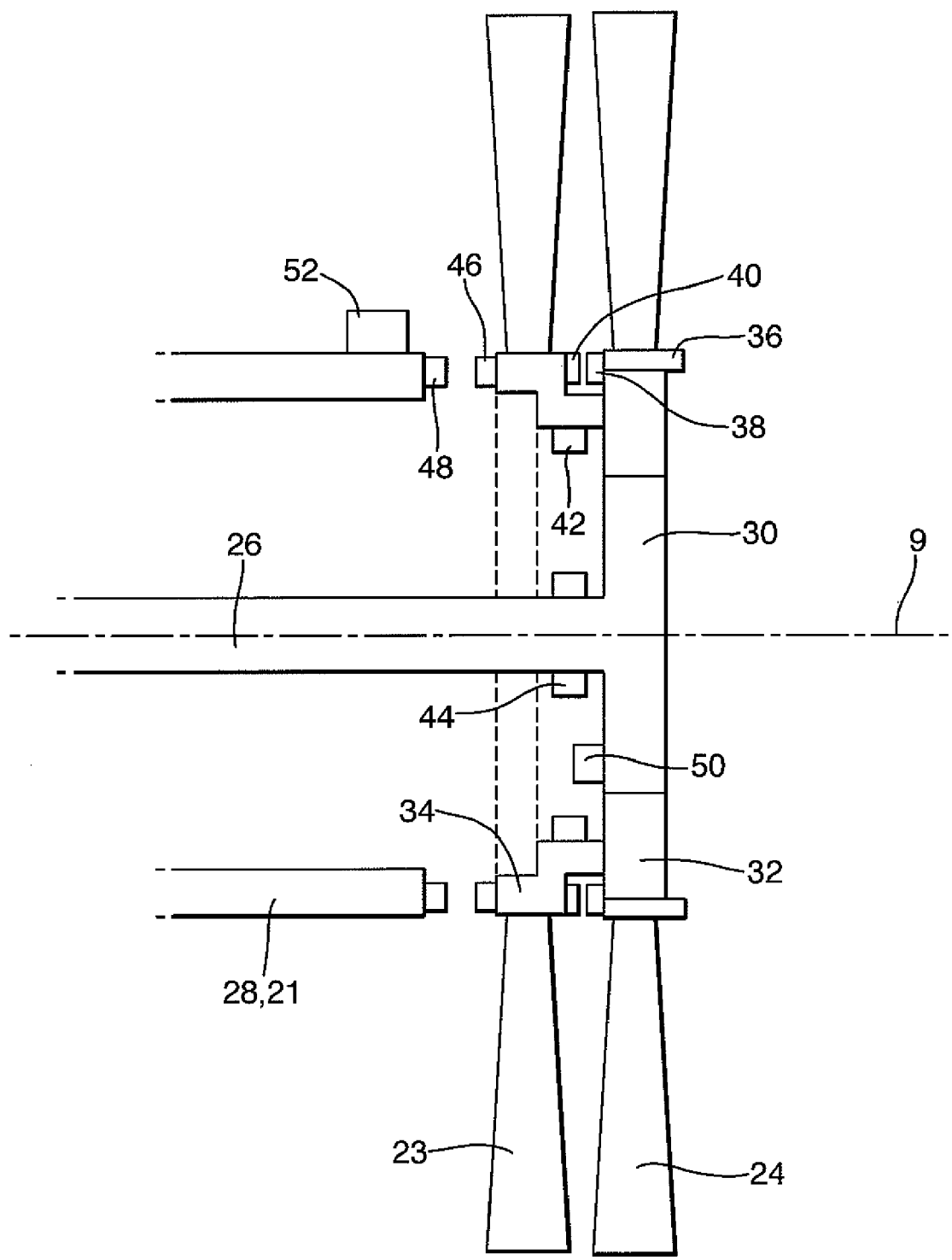
FIG. 3 is a schematic view of the contra-rotating propeller stages of the gas turbine engine of FIG. 2 incorporating a rotor overspeed system according to the present invention.

An exemplary embodiment of the present invention is shown schematically in FIG. 3. The shaft 26 connects at a first end to the free power turbine 19 and at the second end to the propellers 23, 24 and is surrounded by a fixed structure 28 of the engine, for example a part of the nacelle 21. The second end of the shaft 26 is connected to or formed integrally with a sun wheel 30 of an epicyclic and differential gear arrangement. This comprises conventional components and works in the conventional way. Thus, the sun wheel 30 is toothed and cogs with a number of toothed planets 32, for example three or four planets 32, located radially outwardly of the sun wheel 30. The planets 32 are interconnected by a planet carrier 34 that enables each planet 32 to rotate around its own centre but constrains the planets 32 to traverse around the sun wheel 30 in synchronicity. The planet carrier 34 may be substantially annular or toroidal and is sufficiently spaced from the shaft 26 that each may rotate independently of the other. Radially outwardly of the planets 32 is an annulus or ring gear 36 that is toothed to cog with the planets 32. The forward propeller stage 23, comprising an array of rotor blades, is connected to the planet carrier 34 and the rear propeller stage 24, comprising a similar array of rotor blades, is connected to the ring gear 36.

As is well understood, the sun wheel 30 rotates with the driving shaft 26 whilst the planets 32 and ring gear 36 rotate relative thereto. By appropriate sizing of the components, the torque ratio between the two propeller stages 23, 24 may be set so that the sun wheel 30 is driven by power generated by the core engine 11 and the power is distributed by the epicyclic gear arrangement to each of the propellers 23, 24 in the prescribed torque ratio.

It is known to provide electrical generation mechanism using the relative rotation between two rotating components, or one rotating and one stationary component, see for example GB 603,450. The precise form of the electrical generation mechanism does not affect the present invention. As shown in FIG. 3 there are several alternative locations for the pairs of electrical generation mechanisms. In a first arrangement, one half of the electrical generation mechanism 38 is attached to the annulus or ring gear 36 facing the other half of the electrical generation mechanism 40 that is attached to the rear of the planet carrier 34. In a second arrangement, one half of the electrical generation mechanism 42 is attached to the radially inner portion of the planet carrier 34 and faces the other half of the electrical generation mechanism 44 that is attached to the shaft 26 or sun wheel 30 (not shown). In a third arrangement, one half of the electrical generation mechanism 46 is attached to the front of the planet carrier 34 and faces the other half of the electrical generation mechanism 48 that is attached to the engine fixed structure 28. The electrical generation mechanism could also be attached to the rotor blades themselves but this is less preferable because it would be exposed and need a flexible electrical harness.

The electrical generation mechanism is controlled by suitable control mechanism 50, which may comprise electronics. Preferably the control mechanism 50 are located with one or both of the halves of the electrical generation mechanism 38, 40; 42, 44; 46, 48 so that the control mechanism 50 experience the same rotating frame of reference. Alternatively, however, the control mechanism 50 may be located with the fixed structure 28 of the engine 10 or may be integral with the engine electronic control generally sited on the exterior of the core engine 11. The control mechanism 50 enables the electrical generation means to be switched on or off as required for electrical functions. Typically the electrical generation mechanism powers one or more loads such as anti-icing heat generation. Preferably there is electrical generation mechanism generated by and associated with each propeller stage 23, 24 to enable independent switching in of the electrical loads such as anti-icing on each propeller stage 23, 24.

The present invention provides a method of controlling rotor overspeed and is particularly, though not exclusively, concerned with controlling overspeed caused by the transition from forward to reverse pitch of the rotor blades of the two propeller stages 23, 24. Thus there is also provided any suitable means of detecting overspeed 52 as is conventional in the art, which may be mounted to a static or rotating component. When an impending or actually occurring overspeed condition is detected by the detection mechanism 52, the control mechanism 50 is activated to switch on the electrical generation mechanism for one or more loads such as the anti-icing for the affected propeller stage 23, 24.

In accordance with the present invention, the control mechanism 50 can switch the one or more loads into a high-load state meaning that it draws more power than normal. This is possible during a rotor overspeed event since the propellers 23, 24 are rotating too quickly by definition and so more electricity can be generated. It is beneficial to provide this high-load state capability since the benefit of imposing the load to extract power and thereby slow the propellers 23, 24 still has an effect if applied when the load is already switched on for its normal purpose. For example, the anti-icing load can be switched into a high-load state from its normal load state in response to a rotor overspeed signal from the detector 52 and therefore draws more load than normal. If the anti-icing load is switched into its high-load state from off it imposes a larger load increase. Any excess heat generated by switching the one or more loads into a high-load state will be dissipated through the surrounding components and to the atmosphere. It is to be understood that the load or loads will not be in their high-load states for extended periods since they can be switched back into normal load state or switched off as soon as the rotor overspeed is controlled. Therefore there is only a short time in which excess heat may be generated.

One advantage of the method and arrangement of the present invention is that, compared to prior art arrangements, there is little or no need to reduce the rotational speed of the propellers 23, 24 prior to transitioning between forward and reverse pitch. This means that faster go-around acceleration is retained, which improves the safety margins on aircraft approach to landing. Another advantage is that it increases the envelope of available reverse thrust and thus provides more breaking power for use in adverse conditions. A further advantage of the method and arrangement of the present invention is that the maximum blade pitch change angle may be lower, due to the breaking effect of the present invention. This may reduce both cost and weight.

Although the present invention has been described with respect to switching an anti-icing load into a high-load state there may be additional benefits to be obtained by making available one or more other loads. This means that all the loads may be switched into high-load states, or they may be switched into normal or high-load states in any combination to achieve the required level of rotor slowing without applying excessive additional loading. This is attractive because more subtle control of the overspeed is available. However, this needs to be balanced against the increased weight and complexity inherent in providing multiple loads and control modes.

A further advantage of providing more than one load to switch into high-load states in various combinations to control rotor overspeed is that one or more of the loads can be used as a parking brake to prevent rotation of one or both propellers 23, 24 when the aircraft is on the ground. It is usual to prevent rotation of the propellers 23, 24 when on the ground, as it is less hazardous to personnel around the aircraft and engines. However, it is typically achieved by tying down the propellers 23, 24, which is time-consuming and requires someone to get close to the engine to attach the straps. With the arrangement of the present invention at least one of the electrical loads may be switched into a normal load state to counteract rotation of the propeller stage 23, 24 that is caused by wind.

Where multiple loads are provided to enable rotor overspeed protection according to the method of the present invention, the loads may be connected to the electrical generation means in parallel or series. This is a design choice influenced by the desired control modes and redundancy deemed necessary.

Although the present invention has been described with respect to a distinct overspeed limit, in practice it may be beneficial to have an overspeed range to trigger the rotor overspeed control of the present invention. In this way, the at least one load may be switched on or into a high load state when the speed of the rotor is approaching, but has not yet reached, the overspeed limit. This can provide a more timely, and therefore quicker acting, response to the overspeed condition. An overspeed range also allows the option to switch on and switch off the extra loading at different speeds to give more flexibility in the design. The term "overspeed" is therefore used to cover actual overspeed of the rotor and impending or imminent overspeed. A generated overspeed signal thus relates to an actual or impending overspeed condition.

Although the present invention has been described with respect to the propeller stages 23, 24 being driven via an epicyclic gear arrangement, other arrangements to split the torque generated by the core engine 11 between the propeller stages 23, 24 may be substituted with equal felicity.

Although the present invention has been described and shown with respect to a particular engine architecture, other architectures are feasible.

What is claimed is:

1. An engine having at least one stage of propeller rotor blades, and an electrical load, the at least one rotor blade stage being coupled to electrical generation means to generate electricity for the load, wherein the electrical load is switchable into a high load state in response to an overspeed signal relating to the at least one rotor blade stage.

2. An engine as claimed in claim 1 wherein there is more than one electrical load, each load being switchable into a high load state in response to an overspeed signal.

3. An engine as claimed in claim 1 wherein the electrical generation means is positioned between the at least one stage of propeller rotor blades and a fixed structure of the engine.

4. An engine as claimed in claim 1 wherein there are two stages of propeller rotor blades and the electrical generation means is positioned between the two stages.

5. An engine as claimed in claim 1 wherein the electrical generation means is positioned between the at least one stage and another rotating component in the engine.

6. An engine as claimed in claim 1 wherein the engine further comprises detector means to detect a rotor overspeed condition and produce the overspeed signal.

7. An engine as claimed in claim 1 wherein the engine further comprises detector means to detect an impending rotor overspeed condition and produce the overspeed signal.

8. An engine as claimed in claim 1 wherein the engine further comprises control means to switch the electrical load into a high load state in the event of an overspeed signal.

9. An aircraft comprising a fuselage an engine affixed to said fuselage and having an output shaft;

at least one stage of propeller rotor blades attached to said output shaft, an electrical load, the rotor blades stage being coupled to electrical generation means to generate electricity for the load, wherein the electrical load is switchable into a high load state in response to an overspeed signal relating to the at least one rotor blade stage.

10. A method of controlling rotor overspeed of an engine, the engine having at least one stage of propeller rotor blades, an electrical load and means to generate electricity for the load, the method characterised by the steps of:

i. detecting an overspeed signal relating to the at least one stage, and ii. switching the load into a high load state to apply torque to the at least one stage to counteract the overspeed.

11. A method as claimed in claim 10 wherein step 10i further comprises the step of detecting when the at least one stage is within a predetermined overspeed range.

12. A method as claimed in claim 10 wherein the engine has more than one load and step 10ii further comprises the step of switching at least one load into a high load state.

13. A method as claimed in claim 10 wherein the engine has more than one load and step 10ii further comprises the step of switching at least one load into a high load state and at least one other load into a normal load state.

14. A method as claimed in claim 11 wherein the overspeed range is set to be greater than or equal to zero rpm to provide rotor braking.

* * * * *